May 26, 1925.

W. ADRIAN

ENGINE STARTING MECHANISM

Filed March 1, 1922

Inventor:
WALTER ADRIAN,
John H. Bruninga
His Attorney.

Patented May 26, 1925.

1,539,532

UNITED STATES PATENT OFFICE.

WALTER ADRIAN, OF WARDSVILLE, MISSOURI.

ENGINE-STARTING MECHANISM.

Application filed March 1, 1922. Serial No. 540,375.

*To all whom it may concern:*

Be it known that I, WALTER ADRIAN, a citizen of the United States, and residing at Wardsville, county of Cole, State of Missouri, have invented the new and useful Improvement in Engine-Starting Mechanism, of which the following is a specification.

This invention relates to engine starting mechanism, and more particularly to mechanically operated mechanism for starting internal combustion engines.

One of the objects of this invention is to provide mechanically operated means adapted for connection to the engine to crank the same until it fires.

Another object of this invention is to provide such mechanism which will automatically be connected so that the engine after firing will restore the starting mechanism to its original setting preparatory to a new starting operation.

Further objects will appear from the detail description taken in connection with the accompanying drawing, in which.

Figure 1:
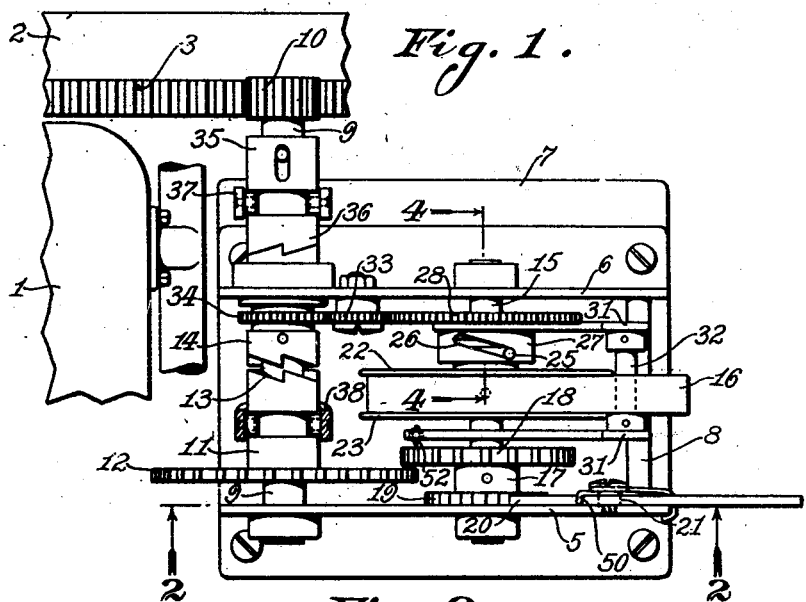
Figure 1 is a plan view showing a mechanism embodying this invention.

Referring to the accompanying drawing, 1 designates the engine of which the fly wheel 2 is provided at its rim with a gear 3. Mounted on the engine frame in any suitable manner is a bracket 4 upon which the starting mechanism is mounted.

This mechanism comprises a frame consisting of a pair of end plates 5 and 6 mounted on a base plate 7 suitably attached to the bracket 4. The plates 5 and 6 are suitably braced by one or more cross bars 8. Mounted in bearings in the end plates 5 and 6 is a shaft 9 provided at one end with a pinion 10 adapted to mesh with the gear 3. This shaft carries a grooved sleeve 11 movably mounted on the shaft and carrying a gear 12. The other end of the sleeve 11 is provided with a one-way clutch face 13 adapted to engage a corresponding clutch face on a sleeve 14 fixed to the shaft 9.

The clutch 13 is arranged so that when brought into engagement with the clutch 14 and driven by the gear 12, it will drive the shaft 9 in such a direction as to start the fly wheel 2 in its proper direction of rotation. When, however, the engine drives, the fly wheel 2 will drive the shaft 9 at increasing speed so that the clutch 13, 14 will be forced out of engagement, the sleeve 11 sliding along the shaft 9 to accomplish such disengagement.

Mounted in suitable bearings in the end plates 5 and 6 is a second shaft 15 to which is attached the inner end of a spiral spring 16, the outer end of which may be attached to one of the cross bars 8. Fixed to the shaft 15 is a sleeve 17 carrying a gear 18 adapted to mesh with the gear 12 and a ratchet wheel 19 adapted to be engaged by a ratchet pawl 20 pivoted at 21 on the end plate 5 and suitably spring-pressed into engagement with the ratchet wheel 19 by a spring 50 connected to the end plate 5. The gear 18 is so positioned that when the sleeve 11 is moved so as to engage the clutch 13, the gear 12 thereon will be moved into engagement with the gear 18.

Figure 2:
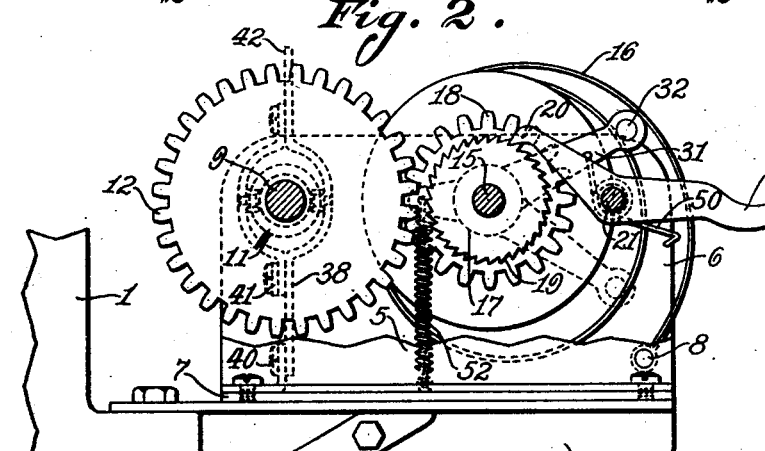
Figure 2 is a partial section on line 2—2, Figure 1.
Figure 4:
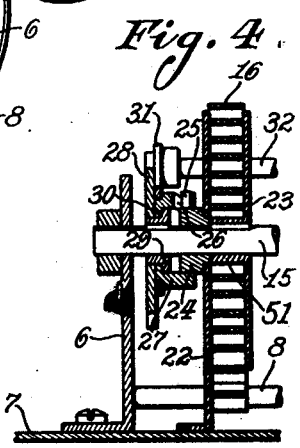
Figure 4 is a detail section on line 4—4, Figure 1.

The spring 16 is confined between plates 22 and 23 adapted to guide the spring and prevent buckling thereof. The plate 23 has a hub 51 keyed to the shaft 15, and to this hub the inner end of the spring is attached. The plate 22 is attached to the base plate 7, and is provided with a fixed hub 24 carrying a pin 25. This pin engages a cam groove 26 in a sleeve 27 movably mounted on the hub 24. A gear 28 has a hub which is splined to the shaft 15, and this hub is provided with a shoulder 29. The sleeve 27 is arranged to fit loosely over the shoulder 29 and is in turn provided with a shoulder 30 adapted to fit over the shoulder 29 so as to loosely connect the sleeve 27 with the gear 28 as indicated in Figure 4. The sleeve 27 has attached thereto a stirrup comprising a pair of arms 31 connected by a cross bar 32 passing between the last two leaves or turns of the spring 16. One of these arms has an extension connected by a spring 52 with the base. By this arrangement the bar 32 will be crowded downwardly by the movement of the leaves of the spring 16 during the winding operation to the position shown in dotted lines in Figure 2. During the movement of the arms 31 to this position the sleeve 27 will be moved relatively to the pin 25 so that by the cam action between said pin and the slot 26, the sleeve 27 will be moved downwardly, Figure 1, carrying the gear 28 with it, and also moving the stirrup along the shaft. In the normal position as shown in Figure 1, the gear 28 meshes with an idler gear 33 mounted on the end plate 6 which, in turn, meshes with a gear 34 on the sleeve 14 fixed to the shaft 9. It will be seen that by the downward movement just described the gear 28 will be carried out of engagement with the gear 33, while it will be moved back into mesh by the spring 52 when the spring 16 is again unwound.

The shaft 9 carries a second slidable sleeve 35 grooved similarly to the sleeve 11 and having a similar clutch face 36. The clutch face 36 is, however, arranged oppositely to the face 13 so that it will be held in engagement when the fly wheel 2 is driving the shaft 9 and will be thrown out of engagement upon reversing the direction of drive.

The grooves in the sleeves 11 and 35 are engaged by cam rollers on the forked ends of levers 37 and 38 respectively pivoted at 39 and 40 and connected by a link 41. The lever 38 may be provided with a manipulative element 42, while the pawl 20 has an extension 43, both of which may be manually operated or may be suitably connected (as by cables or wires, not shown) with a distant point of operation, such as the driver's seat of an automobile, for manipulation from that point. By movement of the manipulative element 42, the levers 37 and 38 will be moved in unison so as to operate the clutch faces 13 and 36 simultaneously.

Figure 3:
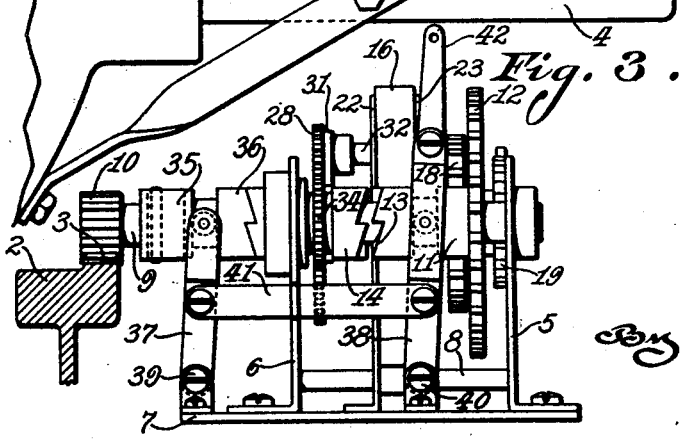
Figure 3 is an end view taken from the left hand end of Figure 1.

The operation of the device is as follows:—Assuming that the spring 16 is completely wound and retained under tension by engagement of the pawl 20 with the ratchet wheel 19, the operator will move the element 42 to the left, Figure 3, to engage the clutch 13 and disengage the clutch 36. He will then move the manipulative element 43 attached to the pawl 20 (and which may also be suitably connected with the driver's seat) downwardly, Figure 2, so as to release the ratchet wheel 19. The gear 12 having been moved into engagement with the gear 18 by the manipulation of the element 42, the spring 16 will rotate the shaft 15 upon release of the ratchet wheel 19 and through the gears 18 and 12, will rotate the shaft 9 and this in turn through the gears 10 and 3 will turn the wheel 2 so as to start the engine. As the spring 16 unwinds the bar 32 will be allowed to rise to the full line position, Figure 2. This will operate to move the gear 28 into mesh with the gear 33 in position for the rewinding operation. As soon as the engine fires, the fly wheel 2 will begin to drive the shaft 9. This will reverse the direction of drive through the clutch 13 so as to throw that clutch out of engagement at the same time, throwing the clutch 36 into engagement through the agency of the connected arms 38 and 37. With the clutch 36 in engagement, the shaft 9 will be driven by the engine and through the gears 34, 33 and 28 will drive the shaft 15 to rewind the spring 16. As the rewinding operation approaches completion, the outer leaf of the spring 16 will contract and by cam action on the bar 32 will move said bar downwardly to the dotted line position, Figure 2. This movement will rotate the sleeve 27 so that through the action of the pin 25 and the slot 26, the gear 28 will be drawn out of engagement with the gear 33, as described above. The spring will thus be rewound and the winding connection broken on completion of the winding operation. The pawl 20 engaging the ratchet wheel 19 will retain the spring under tension until the starting operation is to be repeated.

It is obvious that various changes may be made in details of construction without departing from the spirit of this invention; it is, therefore, to be understood that this invention is not to be limited to the specific construction shown and described.

Having thus described the invention, what is claimed is:

1. A starter for internal combustion engines, comprising, a shaft geared to the engine, a spring motor, gearing adapted to connect said motor with said shaft for driving the same, connections from said shaft to said motor for rewinding said motor, and means for simultaneously releasing said connections and engaging said gearing adapted to disengage said gearing and reestablish said connections to rewind said motor when the engine starts.

2. A starter for internal combustion engines, comprising, a shaft geared to the engine, a spring motor, gearing adapted to connect said motor with said shaft for driving the same, connections from said shaft to said motor for rewinding said motor, means for simultaneously releasing said connections and engaging said gearing adapted to disengage said gearing and reestablish said connections to rewind said motor when the engine starts, and means for automatically disengaging said connections when said motor is completely wound.

3. A starter for internal combustion engines, comprising, a shaft geared to the engine, a spring motor, gearing adapted to connect said motor with said shaft for driving the same, connections from said shaft to said motor for rewinding said motor, means for simultaneously releasing said connections and engaging said gearing adapted to disengage said gearing and reestablish said connections to rewind said motor when the engine starts, and means for automatically disengaging said connections when said motor is completely wound adapted to reengage said connections when said motor becomes unwound.

4. A starter for internal combustion engines, comprising, a shaft geared to the engine, a spring motor, gearing adapted to connect said motor with said shaft for driving the same, connections from said shaft to said motor for rewinding said motor, means for simultaneously releasing said connections and engaging said gearing adapted to disengage said gearing and reestablish said connections to rewind said motor when the engine starts, and means for starting said motor when said gearing is engaged.

5. A starter for internal combustion engines, comprising, a shaft geared to the engine, a spring motor, gearing adapted to connect said motor with said shaft for driving the same, connections from said shaft to said motor for rewinding said motor, means for simultaneously releasing said connections and engaging said gearing adapted to disengage said gearing and reestablish said connections to rewind said motor when the engine starts, and means for holding said motor wound up adapted to be released when said gearing is engaged.

6. A starter for internal combustion engines, comprising, a shaft geared to the engine, a spring motor, gearing adapted to connect said motor with said shaft for driving the same, connections from said shaft to said motor for rewinding said motor, means for simultaneously releasing said connections and engaging said gearing adapted to disengage said gearing and reestablish said connections to rewind said motor when the engine starts, means for automatically disengaging said connections when said motor is completely wound, and means for holding said motor wound up adapted to be released when said gearing is engaged.

7. A starter for internal combustion engines, comprising, a shaft geared to the engine, a spring motor, driving gearing from said motor to said shaft, rewinding gearing from said shaft to said motor, means for simultaneously engaging said driving gearing and disengaging said rewinding gearing, and means operating upon starting of the engine adapted to disengage said driving gearing and enage said rewinding gearing.

8. A starter for internal combustion engines, comprising, a shaft geared to the engine, a spring motor, driving gearing from said motor to said shaft, rewinding gearing from said shaft to said motor, means for simultaneously engaging said driving gearing and disengaging said rewinding gearing, means operating upon starting of the engine adapted to disengage said driving gearing and engage said rewinding gearing, and means operating when the motor is completely wound to disengage said rewinding gearing.

9. A starter for internal combustion engines, comprising, a shaft geared to the engine, a spring motor, driving gearing from said motor to said shaft, rewinding gearing from said shaft to said motor, means for simultaneously engaging said driving gearing and disengaging said rewinding gearing, means operating upon starting of the engine adapted to disengage said driving gearing and engage said rewinding gearing, and means operating when the motor is completely wound to disengage said rewinding gearing, adapted to again reengage said rewinding gearing when the motor becomes unwound.

10. A starter for internal combustion engines, comprising, a shaft geared to the engine, a spring motor, driving gearing from said motor to said shaft, rewinding gearing from said shaft to said motor, means for simultaneously engaging said driving gearing and disengaging said rewinding gearing, means for starting said motor, and means for operating upon starting of the engine adapted to disengage said driving gearing and engage said rewinding gearing.

In testimony whereof I affix my signature this 9th day of February, 1922.

WALTER ADRIAN.